(No Model.)

M. A. NORTON.
VELOCIPEDE.

No. 393,387. Patented Nov. 27, 1888.

Witnesses:
Edward E. Claussen
John H. White

Inventor:
Malcolm A. Norton.
by Albert H. Walker, Atty.

UNITED STATES PATENT OFFICE

MALCOLM A. NORTON, OF HARTFORD, CONNECTICUT.

VELOCIPEDE.

SPECIFICATION forming part of Letters Patent No. 393,387, dated November 27, 1888.

Application filed August 9, 1888. Serial No. 282,322. (No model.)

*To all whom it may concern:*

Be it known that I, MALCOLM A. NORTON, of Hartford, Connecticut, have invented a new and useful Bicycle-Fork, of which the following description and claims constitute the specification, and which is illustrated by the accompanying sheet of drawings.

This invention is a fork standing astride of the forward wheel of a bicycle and supported by the axle of that wheel and supporting the forward end of the bicycle-backbone, and it is particularly adapted to those bicycles which have two wheels of substantially identical diameter, and which are generally called "safety-bicycles."

Figure 1:
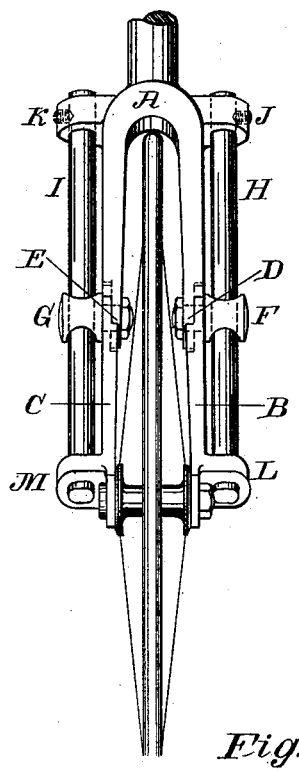
Figure 2:
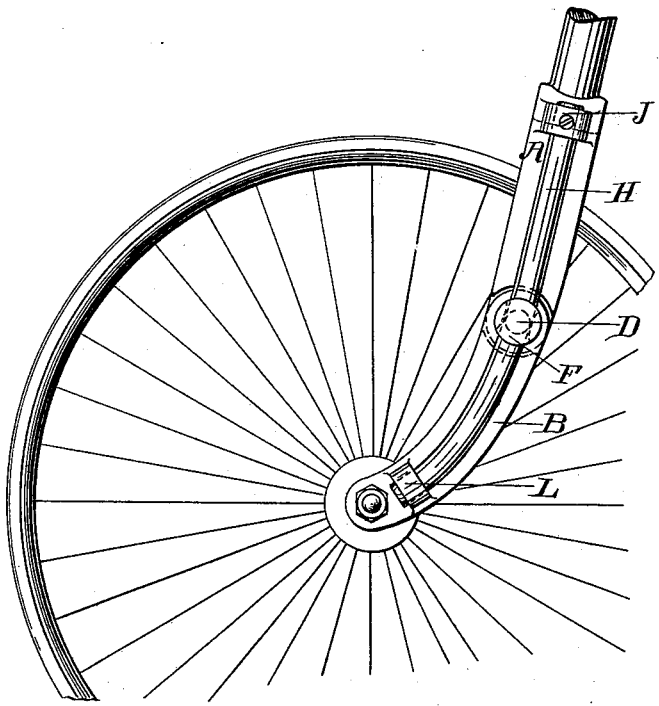
Figure 3:
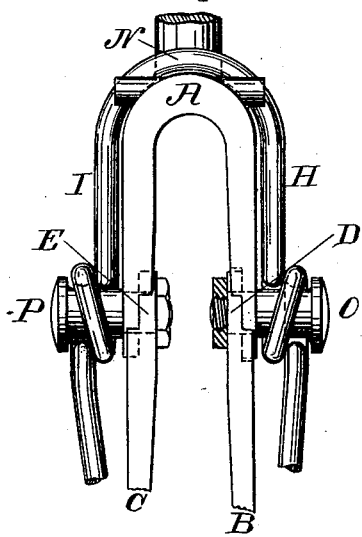

Figure 1 of the drawings is a fragmentary front elevation of my invention standing astride of a bicycle-wheel. Fig. 2 is a view of the right-hand side of what is shown in Fig. 1. Fig. 3 is a fragmentary front view of my invention in a modified form, and Fig. 4 is a view of the right-hand side of what is shown in Fig. 3.

The letter A indicates the upper part of the body of the bicycle-fork, while B and C indicate the lower parts thereof, which are joined at their upper ends to the lower ends of the upper part by the pivots D and E, respectively, and which pivots admit of motion between the lower parts and the upper part of the fork in the direction in which the bicycle-wheel is to run, but do not admit of material motion in any other direction. The pivots D and E, in the form of fork shown in Figs. 1 and 2, are provided with outwardly-extending projections F and G, and those projections are perforated in the direction of the length of the fork for the reception of the springs H and I, respectively. The upper ends of those springs are fixed to the projections J and K, respectively, which extend outwardly from the upper end of the fork, and their lower ends pass through openings in the projections L and M, respectively, which extend outwardly from the lower ends of the fork or are otherwise attached to those projections.

Figure 4:
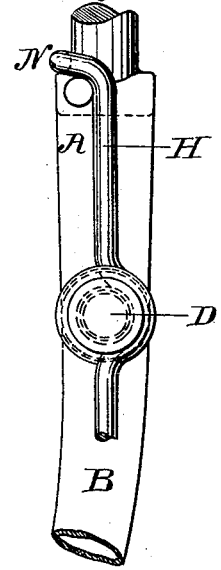

In the modified form of my invention which is shown in Figs. 3 and 4 the springs are united integrally at their upper ends by the bend N, and instead of passing through the perforations in the projections F and G, respectively, they are coiled around the corresponding projections, O and P, respectively.

The mode of operation is as follows: When the forward bicycle-wheel passes over an obstruction or irregularity on the road, the vibration, which would pass to the forward end of the backbone if the fork were rigid, is intercepted by the elasticity of the springs H and I, which permits of the lower ends of the lower parts of the fork rising without correspondingly raising the upper part of the fork, and when the forward bicycle-wheel is turned to the right or left by the handle-bar to alter the direction of the run of the bicycle the handle-bar operates positively and rigidly through the bicycle-fork upon the bicycle-wheel, because the joints in the fork do not admit of any torsional motion.

I do not confine myself to either or both of the forms of my invention which are shown in the drawings, because variations may be made therein without changing the essential character of the invention.

I claim as my invention—

1. A bicycle-fork each side of which is provided with a joint which admits of motion in the direction of the bicycle-wheel running between those sides and does not admit of material motion in any other direction, and each side of which is also provided with a spring extending longitudinally thereof in opposite directions from that joint and attached thereto away from opposite sides of that joint, all substantially as described.

2. A bicycle-fork consisting of the upper part, A, the lower parts, B and C, the pivots D and E, provided with the projections F and G, and the springs H and I, passing through those projections and attached to the upper part, A, and the lower parts, B and C, all substantially as described.

Hartford, Connecticut, August 8, 1888.

MALCOLM A. NORTON.

Witnesses:
ALBERT H. WALKER,
JOHN H. WHITE.